(12) United States Patent
Kaneko et al.

(10) Patent No.: US 7,944,644 B2
(45) Date of Patent: May 17, 2011

(54) ROTATING DISK STORAGE DEVICE HAVING A SPOILER

(75) Inventors: Jiro Kaneko, Kanagawa (JP); Masaki Ootsuka, Kanagawa (JP); Yuuichi Ootani, Kanagawa (JP); Kazuya Sekiguchi, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 909 days.

(21) Appl. No.: 11/903,010

(22) Filed: Sep. 19, 2007

(65) Prior Publication Data
US 2008/0068746 A1 Mar. 20, 2008

(30) Foreign Application Priority Data
Sep. 19, 2006 (JP) .................. 2006-252584

(51) Int. Cl.
*G11B 33/14* (2006.01)
(52) U.S. Cl. .................. 360/97.02; 360/97.03
(58) Field of Classification Search ............... 360/97.02, 360/97.03
See application file for complete search history.

(56) References Cited

U.S. PATENT DOCUMENTS

| | | | | |
|---|---|---|---|---|
| 4,369,475 A * | 1/1983 | Ho et al. | ............... | 360/97.02 |
| 5,036,416 A * | 7/1991 | Mastache | ............... | 360/256.1 |
| 5,134,530 A * | 7/1992 | Hall | ............... | 360/97.03 |
| 5,140,578 A * | 8/1992 | Tohkairin | ............... | 720/648 |
| 5,212,679 A * | 5/1993 | Tohkairin | ............... | 720/648 |
| 5,517,372 A | 5/1996 | Shibuya et al. | | |
| 6,031,690 A * | 2/2000 | Kelemen et al. | ............... | 360/256.1 |
| 6,882,501 B2 * | 4/2005 | Machcha et al. | ............... | 360/97.03 |
| 6,903,899 B2 | 6/2005 | Sakata et al. | | |
| 7,027,259 B2 | 4/2006 | Myokan et al. | | |
| 7,203,030 B2 * | 4/2007 | Chan et al. | ............... | 360/97.02 |
| 7,215,507 B2 * | 5/2007 | Machcha et al. | ............... | 360/97.03 |
| 7,545,600 B2 * | 6/2009 | Sorrell et al. | ............... | 360/97.02 |
| 7,599,148 B2 * | 10/2009 | Chan et al. | ............... | 360/97.02 |
| 2002/0149876 A1 * | 10/2002 | Sakata et al. | ............... | 360/97.02 |
| 2003/0156352 A1 * | 8/2003 | Voights et al. | ............... | 360/97.02 |

FOREIGN PATENT DOCUMENTS

| | | |
|---|---|---|
| JP | 06-111560 | 4/1994 |
| JP | 10-302421 | 11/1998 |
| JP | 2002-184154 | 6/2002 |
| JP | 2002-343061 | 11/2002 |
| JP | 2004-234784 | 8/2004 |
| JP | 2005-018937 | 1/2005 |
| JP | 2006-018937 | 1/2006 |

* cited by examiner

*Primary Examiner* — Angel A. Castro (57) ABSTRACT

Embodiments of the present invention effectively control utilizing a spoiler, the windage vibration of a magnetic head caused by the airflow generated in accordance with rotation of a magnetic disk, while reducing the dust flowing in on the downstream side of the spoiler. According to one embodiment, a spoiler is provided with wings facing a plurality of magnetic disks and a supporting section for the wings is disposed on the upstream side of a head stack assembly in the airflow direction in accordance with the rotation of the magnetic disks. Further, the wings each extend in a direction from the outer circumferences of the magnetic disks towards the spindle shaft while reducing the width of the wing, and is formed to have the width of the wing in a range of 2.7% through 2.9% of the circumferential length of the magnetic disks in a range of two thirds of the length of the wing in a direction towards the spindle shaft from a region located at the outer circumferences of the magnetic disks.

14 Claims, 10 Drawing Sheets

| MARK | SPECIFICATION | UNIT | SPOILER 61 | SPOILER 15 | NOTE |
|---|---|---|---|---|---|
| A | DISK RADIUS | mm | 42 | 42 | |
| B | DISK ROTATIONAL SPEED | rpm | 10000 | 10000 | |
| C | DISK CIRCUMFERENTIAL LENGTH | mm | | | |
| | RADIAL POSITION 42 | | 264 | 264 | |
| | RADIAL POSITION 37 | | 232 | 232 | |
| | RADIAL POSITION 32 | | 201 | 201 | |
| | RADIAL POSITION 27 | | 170 | 170 | |
| D | SPOILER WIDTH | | | | |
| | RADIAL POSITION 42 | mm | 12.16 | 7.13 | |
| | RADIAL POSITION 37 | mm | 9.35 | 6.52 | |
| | RADIAL POSITION 32 | mm | 6.08 | 5.84 | |
| | RADIAL POSITION 27 | mm | 2.5 | 2.72 | |
| E | D/C | | | | |
| | RADIAL POSITION 42 | | 4.6% | 2.7% | |
| | RADIAL POSITION 37 | | 4.0% | 2.8% | |
| | RADIAL POSITION 32 | | 3.0% | 2.9% | |
| | RADIAL POSITION 27 | | 1.5% | 1.6% | |
| F | DISK CIRCUMFERENTIAL VELOCITY | mm/s | | | |
| | RADIAL POSITION 42 | | 4.398E+04 | 4.398E+04 | |
| | RADIAL POSITION 37 | | 3.875E+04 | 3.875E+04 | |
| | RADIAL POSITION 32 | | 3.351E+04 | 3.351E+04 | |
| | RADIAL POSITION 27 | | 2.827E+04 | 2.827E+04 | |
| G | D/F | | | | <= TIME FOR MAGNETIC DISK TO PASS SPOILER WIDTH |
| | RADIAL POSITION 42 | sec | 2.765E-04 | 1.621E-04 | |
| | RADIAL POSITION 37 | | 2.413E-04 | 1.683E-04 | |
| | RADIAL POSITION 32 | | 1.814E-04 | 1.743E-04 | |
| | RADIAL POSITION 27 | | 8.842E-05 | 9.620E-05 | |

| | WITHOUT SPOILER | SPOILER 61 | SPOILER 15 |
|---|---|---|---|
| 1B | 13384 | 7951 | 4854 |
| 1A | 4322 | 13005 | 8486 |
| 2B | 3759 | 12593 | 9235 |
| 2A | 5517 | 19751 | 13597 |
| 3B | 4481 | 18396 | 13254 |
| 3A | 4622 | 21653 | 14096 |
| 4B | 3950 | 19886 | 12564 |
| 4A | 2916 | 16847 | 11255 |
| 5B | 2638 | 16471 | 11026 |
| 5A | 13364 | 29566 | 24457 |
| Total | 58953 | 176116 | 122820 |

ROTATING DISK STORAGE DEVICE HAVING A SPOILER

CROSS-REFERENCE TO RELATED APPLICATION

The instant nonprovisional patent application claims priority to Japanese Patent Application No. 2006-252584 filed Sep. 19, 2006 and which is incorporated by reference in its entirety herein for all purposes.

BACKGROUND OF THE INVENTION

Magnetic disk drives, as an example of a rotating disk type storage device, are used as data recording devices for personal computers, servers, and so on. The magnetic disk drives are each provided with a discoid magnetic disk having a recording surface formed by providing a magnetic layer on a substrate and provided so as to rotate around a spindle shaft, a head stack assembly, and a control unit for controlling data read/write to the magnetic disk and operation of the head stack assembly.

The head stack assembly is composed of head gimbal assemblies each corresponding to respective one of recording surfaces of the magnetic disk(s), a carriage, and a pivot cartridge, each of the head gimbal assemblies being fixed to an actuator arm provided to the carriage. The head gimbal assembly is equipped with a slider provided with a magnetic head for reading and writing data with the magnetic disk and for providing an air bearing surface (ABS). A part of the carriage is provided with a coil support, and the coil support holds a voice coil. The voice coil is disposed in the magnetic field formed by a voice coil magnet and a voice coil yoke, and the voice coil magnet, the voice coil yoke, and the voice coil form a voice coil motor (VCM) generating a driving force for rotating the carriage. The pivot cartridge is fitted in an opening provided to the carriage, and it is arranged so that the head gimbal assembly is allowed to rotate around the pivot shaft, the shaft of the pivot cartridge.

When the magnetic disk rotates, the airflow on the surface forms the air bearing, and provides ascending force to the air bearing surface of the slider, thereby lifting the slider slightly from the surface of the magnetic disk. By the driving force of the voice coil motor, the slider rotates around the pivot shaft in substantially the radial direction of the magnetic disk while slightly lifted from the surface of the magnetic disk, thus the magnetic head can read and write data at a predetermined position on the surface of the disk.

In accordance with the density growth in magnetic recording to the magnetic disk, improvement in positioning accuracy of the magnetic head is required to such magnetic disk drives. However, the actuator arm and the head gimbal assembly both moving on the surface of the magnetic disk are swung by the airflow in the rotational direction caused by the rotation of the magnetic disk. If the actuator arm or the head gimbal assembly is swung, a so-called windage vibration, which is the vibration of the magnetic head caused by the swing of the actuator arm or the head gimbal assembly transmitted thereto, is increased. The windage vibration becomes one of the factors degrading the positioning accuracy of the magnetic head, and accordingly, needs to be reduced. There has been proposed a magnetic disk drive (see, for example, Japanese Patent Publication No. 2004-234784 ("Patent Document 1"), Japanese Patent Publication No. 2002-313061 ("Patent Document 2"), and Japanese Patent Publication No. 2002-184154 ("Patent Document 3")) provided with a spoiler disposed on the upstream side of the head stack assembly in the airflow in the rotational direction caused by the rotation of the magnetic disk in order for reducing the windage vibration of the magnetic head. This spoiler is capable of weakening the airflow towards the actuator arm or the head gimbal assembly to reduce the windage vibration of the magnetic head. It should be noted that in the present specification, the term "upstream side" and "downstream side" are assumed to be used to indicate directional positions of the airflow in the rotational direction caused by the rotation of the magnetic disk with respect to the objective component.

However, since the wing of the spoiler is disposed in the airflow of the magnetic disk rotating at high speed in such a magnetic disk drive, the pressure in the downstream side of the wing is lowered to cause negative pressure. If the negative pressure is caused in the airflow, there is caused in the negative pressure portion a flow of air flowing in on the surface of the magnetic disk from the surrounding area of the outer periphery of the magnetic disk towards the spindle shaft. Since the head stack assembly and other components exist in the surrounding area of the outer periphery of the magnetic disk, there are relatively large amounts of suspended dust and attached dust. Therefore, it is conceivable that these kinds of dust are caught up in the flow of air from the surrounding area of the outer periphery of the magnetic disk towards the spindle shaft and are attached to the surface of the magnetic disk. If the magnetic head passes above the surface of the magnetic disk attached with the dust, the dust is pinched between the magnetic head and the magnetic disk to cause disadvantages of damaging the magnetic disk to loose the recorded data and damaging the magnetic head.

There is proposed a technology for preventing such dust caused inside the device from obtaining entrance on the surface of the magnetic disk (see, for example, Japanese Patent Publication No. 6-111560 ("Patent Document 4") and Japanese Patent Publication No. 2006-18937 ("Patent Document 5")). The rotating disk type storage device disclosed in Patent Document 4 prevents that the negative pressure is caused on the downstream side of the arm and the air containing the dust flows backward through a through hole of the arm to enter a disk pack housing by providing flow-blocking means to the through hole to form an area with higher pressure than that in the surrounding area of the flow-blocking means. It should be noted that since the arm has a configuration for linearly moving towards the rotational center of the magnetic disk, the distance between the arm and the flow-blocking means can always be kept constant, thus the pressure in the high pressure area can be stabilized, thereby reliably preventing the air containing the dust from flowing backward. However, in the case in which the magnetic head is moved on the magnetic disk by rotationally moving the arm, the distance between the arm and the flow-blocking means cannot always be kept constant, and accordingly, the pressure in the high pressure area might be changed to cause the air containing the dust to flow backward. Further, there is a disadvantage that the arm is swung by the airflow in the rotational direction caused by the rotation of the magnetic disk to increase the windage vibration of the recording head.

Further, in a magnetic disk drive disclosed in Patent Document 5, the dust is removed by providing an airflow path to a spindle hub and disposing a filter in the middle of the airflow path, or by attaching an electrostatic filter to a shroud. However, since the negative pressure is caused on the downstream side of a guide arm when the magnetic head is moved on the magnetic disk, the air containing the dust might flow in from the outside of the magnetic disk on the magnetic disk and might be attached thereto. Further, there is a disadvantage that the guide arm is swung by the airflow in the rotational direction caused by the rotation of the magnetic disk to increase the windage vibration of the magnetic head.

BRIEF SUMMARY OF THE INVENTION

Embodiments of the present invention effectively control utilizing a spoiler, the windage vibration of a magnetic head caused by the airflow generated in accordance with rotation of a magnetic disk, while reducing the dust flowing in on the downstream side of the spoiler. According to the particular embodiment of FIG. 1(A) of the present invention, spoiler 15 is provided with wings 15a through 15d facing the magnetic disks 30a through 30e and a supporting section 16 for the wings 15a through 15d is disposed on the upstream side of a head stack assembly 4 in the airflow in accordance with the rotation of the magnetic disks 30a through 30e. Further, the wings 15a through 15d each extend in a direction from the outer circumferences of the magnetic disks 30a through 30e towards the spindle shaft 7 while reducing the width of the wing, and is formed to have the width of the wing in a range of 2.7% through 2.9% of the circumferential length of the magnetic disks 30a through 30e in a range of two thirds of the length of the wing in a direction towards the spindle shaft 7 from a region 301 located at the outer circumferences of the magnetic disks 30a through 30e.

DETAILED DESCRIPTION OF THE INVENTION

Embodiments in accordance with the present invention relate to a rotating disk type storage device, such as a magnetic disk drive or a magneto optical disk drive, adopting a spoiler for controlling fluctuation of a head caused by an airflow, and in particular, to a rotating disk type storage device capable of reducing the dust flowing in on the disk in the downstream of the spoiler.

An object of embodiments of the present invention is to provide a rotating disk type storage device provided with a structure capable of controlling the windage vibration of the head by a spoiler, the windage vibration being caused by the airflow generated in accordance with the rotation of the rotating disk shaped recording medium, and of reducing the dust flowing in from the surrounding area of the outer periphery of the rotating disk shaped recording medium towards the spindle shaft on the downstream side of the spoiler.

A first aspect of embodiments of the present invention is a rotating disk type storage device including a rotating disk shaped recording medium rotating around a spindle shaft, a head stack assembly pivoting around a pivot shaft, a spoiler provided with a wing facing the rotating disk shaped recording medium and a supporting section for the wing disposed on the upstream side of the head stack assembly in the airflow in accordance with the rotation of the rotating disk shaped recording medium, the wing extending in a direction from the outer circumference of the rotating disk shaped recording medium towards the spindle shaft while reducing the width of the wing, and is formed to have the width of the wing in a range of 2.7% through 2.9% of the circumferential length of the rotating disk shaped recording medium at a region located at the outer circumference of the rotating disk shaped recording medium. More preferably, it is provided with a spoiler having a wing extending in a direction from the outer circumference of the rotating disk shaped recording medium towards the spindle shaft while reducing the width of the wing, and formed to have a substantially constant rate of the width of the wing to the corresponding circumferential length of the rotating disk shaped recording medium at each region within a range from the outer circumference of the rotating disk shaped recording medium to two thirds of the length of the wing in a direction towards the spindle shaft. Specifically, in the wing, the rate of the width of the wing to the corresponding circumferential length of the rotating disk shaped recording medium is 2.8%±0.1%.

According to the first aspect, the spoiler, which is provided with a wing with a selected width of the wing, can weaken the flow rate of the airflow hitting the head stack assembly to reduce the windage vibration of the magnetic head to the extent that no trouble is caused to the position control of the head, and at the same time, reduce the negative pressure caused on the downstream side of the wing better than the conventional wing of the spoiler, thereby reducing the dust flowing into the downstream side. Further, in the wing of the spoiler, by extending an edge portion on the upstream side substantially straight in a direction from the outer circumference side of the rotating disk shaped recording medium towards the spindle shaft and extending an edge portion on the downstream side towards the edge portion on the upstream side so as to gradually narrowing the width, both of the function of controlling the flow rate of the airflow, and the function of reducing the negative pressure caused on the downstream side of the wing, can effectively be satisfied.

A second aspect of embodiments of the present invention further includes a filter disposed between the downstream side of the spoiler and the head stack assembly and along the outer circumference of the rotating disk shaped recording medium. According to the second aspect, even if the negative pressure is caused in the airflow passing through the wing in the downstream side of the spoiler, and the air containing a lot of dust flows in from the surrounding area of the rotating disk shaped recording medium towards the spindle shaft, the dust can be removed by the filter. Further preferably, by providing the partition disposed along the outer circumference of the rotating disk shaped recording medium, the air containing a lot of dust can be prevented from flowing in from the surrounding area of the rotating disk shaped recording medium towards the spindle shaft. Still further preferably, by movably forming the wing of the spoiler, the wing of the spoiler is retracted to prevent the inflow of the dust caused by the negative pressure when the positioning accuracy of the head is not required such as in the start-up state or the stopped state. In this case, since the particularly large amount of dust particles are suspended in the surrounding area of the rotating disk shaped recording medium in the start-up state, the inflow of the dust can effectively be reduced.

Further, a third aspect of embodiments of the present invention is a rotating disk type storage device including a rotating disk shaped recording medium, a head stack assembly pivoting around a pivot shaft, a spoiler provided with a wing facing the rotating disk shaped recording medium and a supporting section for the wing disposed on the upstream side of the head stack assembly in the airflow in accordance with the rotation of the rotating disk shaped recording medium, and an air introducing guide forming a flow path together with the supporting section, and for leading a part of the airflow from the upstream to the downstream of the spoiler. According to the third aspect, by leading a part of the airflow containing a little dust by the air introducing guide from the upstream side to the downstream side of the spoiler without passing through the wing of the spoiler, it becomes possible to reduce the negative pressure caused on the downstream side of the wing of the spoiler to reduce the dust flowing in on the downstream side of the wing of the spoiler.

According to embodiments of the present invention, it becomes possible to provide a rotating disk type storage device having a structure capable of reducing the dust flowing in from the surrounding area of the outer circumference of the rotating disk shaped recording medium towards the spindle shaft on the downstream side of the spoiler when the spoiler is disposed on the upstream side of the head stack assembly.

Figure 1A:
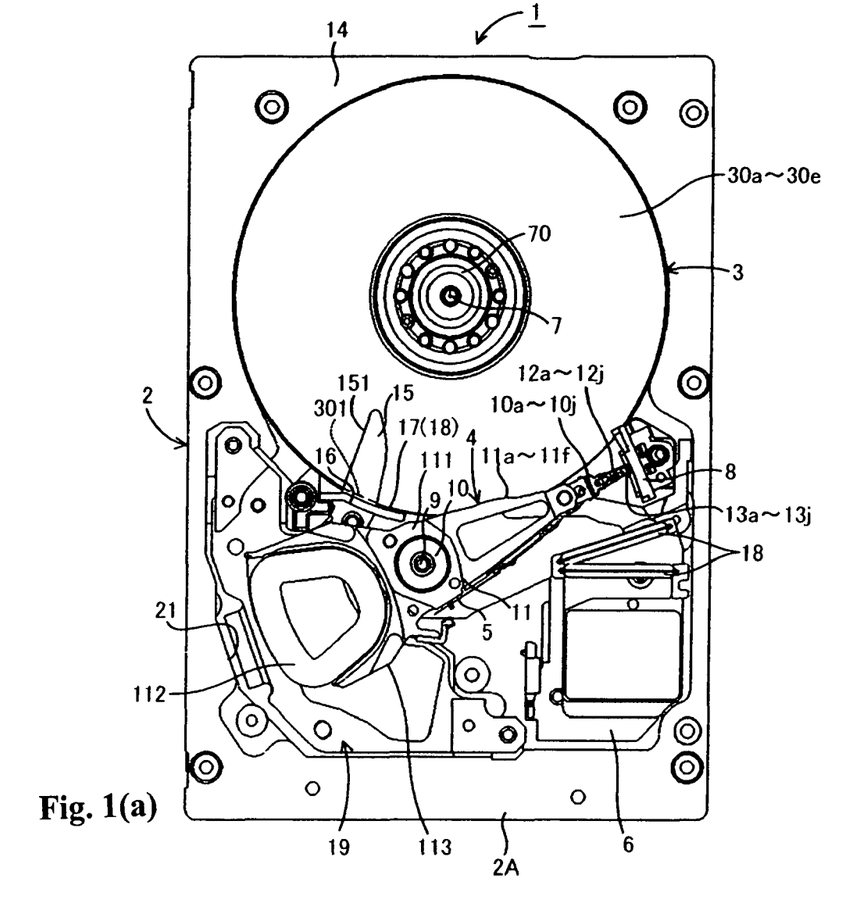
FIGS. 1(A)-1(D) are explanatory diagrams showing the magnetic disk drive according to one of the best modes of the rotating disk type storage device of embodiments of the present invention.
Figure 1B:
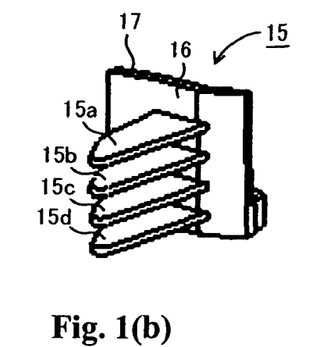
Figure 1C:
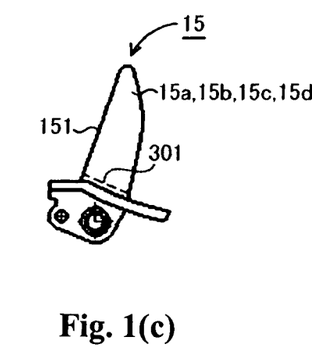
Figure 1D:
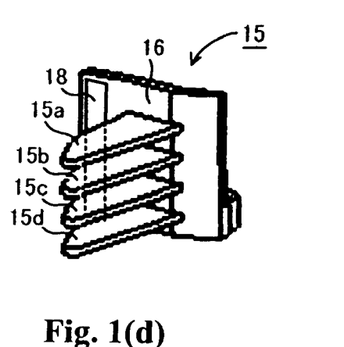
Figure 2A:
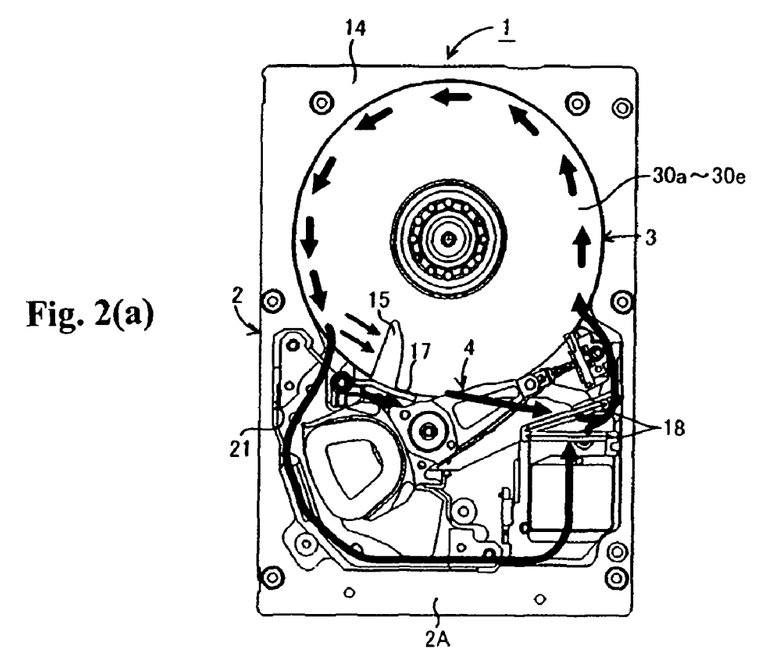
FIGS. 2(A) and 2(B) are schematic views showing a flow path of the airflow of the magnetic disk drive shown in FIGS. 1(A)-1(D).
Figure 2B:
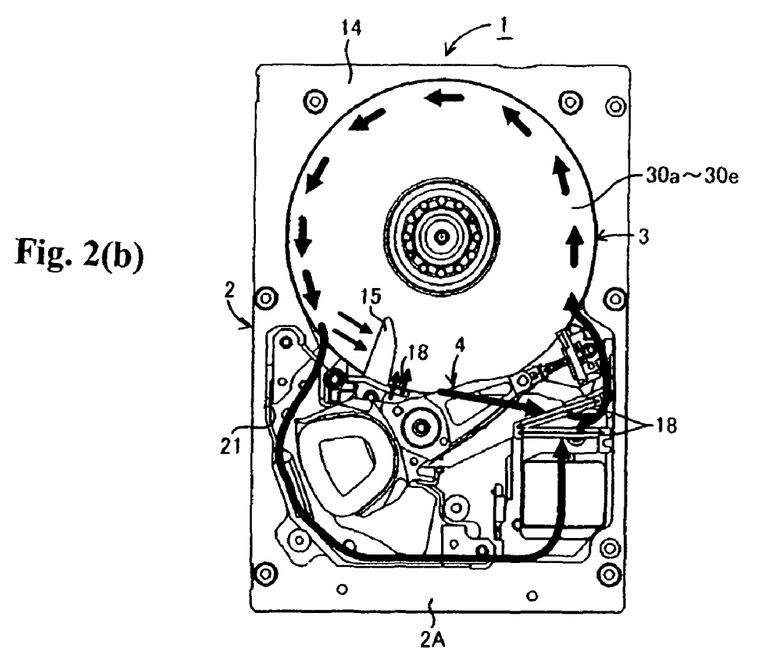

Hereinafter, an example of a mode for carrying out the rotating disk type storage device of an embodiment of the present invention will be explained with reference to the drawings. Throughout the entire specification, the same elements are denoted with the same reference numerals. FIGS. 1(A)-1(D) are diagrams showing the magnetic disk drive according to one embodiment of the present invention, wherein FIG. 1(A) is a plan view showing a schematic configuration of the magnetic disk drive, FIG. 1(B) is a perspective view of the spoiler, FIG. 1(C) is a plan view of the spoiler, and FIG. 1(D) is a perspective view of the spoiler and a filter. FIGS. 2(A) and 2(B) are plan views showing a flow path of the airflow in the magnetic disk drive shown in FIG. 1, wherein FIG. 2(A) is a plan view showing the flow path of the airflow in the magnetic disk drive using the spoiler and a partition, and FIG. 2(B) is a plan view showing the flow path of the airflow in the magnetic disk drive using the spoiler and a filter.

As shown in FIG. 1(A), the magnetic disk drive 1, which is a mode for carrying out an embodiment of the present invention, has a magnetic disk stack 3 as the rotating disk shaped recording medium and the head stack assembly (HSA) 4 housed in a disk enclosure 2, which is formed of a base 2A and a cover (not shown) for covering the top of the base 2A and provides a clean space. Further, inside the base 2A there are incorporated a flexible cable 5 and an external connection terminal 6 attached to the flexible cable 5, and the external connection terminal 6 is connected to a control circuit board (not shown) provided outside the disk enclosure 2. It should be noted that the flexible cable 5 is described with a part thereof omitted for the sake of simplification of the drawing.

The magnetic disk stack 3 is composed of one or a plurality of magnetic disk(s) disposed parallel to the bottom surface of the base 2A, and is screwed to a rotor section of a spindle motor (not shown) provided to the base 2A, thus it is configured that the magnetic disk stack 3 is rotated by the spindle motor around the spindle shaft 7. In the case in which a plurality of magnetic disks is stacked, each of the magnetic disks is attached to the spindle hub 70 at predetermined intervals so as to rotate in an integrated manner around the spindle shaft 7. Further, a recording surface is provided to each of the front side and the reverse side of the magnetic disk. It should be noted that in the present embodiment, five magnetic disks are assumed to be stacked one another in the magnetic disk stack 3, but the top magnetic disk is omitted from FIG. 1A for the sake of explanatory convenience.

The HSA 4 is composed of ten head gimbal assemblies (HGA) 10a, 10b, 10c, 10d, 10e, 10f, 10g, 10h, 10i, and 10j (hereinafter referred to as "HGA 10a through 10j") corresponding to the respective recording surfaces of the five magnetic disks 30a, 30b, 30c, 30d, and 30e (hereinafter referred to as "magnetic disks 30a through 30e") included in the magnetic disk stack 3, and a single carriage 11.

The HGA 10a through 10j are each composed of a magnetic head for performing reading and writing of data with the recording surface of the magnetic disk, a slider provided with the magnetic head, a flexure for flexibly supporting the slider so as to allow a pivot operation of the slider, and one of load beams 12a, 12b, 12c, 12d, 12e, 12f, 12g, 12h, 12i, and 12j (hereinafter referred to as "load beams 12a through 12j") each supporting the flexure so as to apply pressure towards the surface of the magnetic disk to the slider.

The load beams 12a through 12j are respectively provided with tabs 13a through 13j on the tips thereof so as to protrude therefrom, and the tabs 13a through 13j are held by a ramp 8 attached to the base 2A in the outer vicinity of the magnetic disks 30a through 30e when the load beams 12a through 12j are unloaded. The ramp 8 is a composing element adopted in a load/unload method, which is a technique for providing the slider with a retraction space when stopping the rotation of the magnetic disks 30a through 30e, and is disclosed in, for example, Japanese Laid-Open Patent No. JP-A-10-302421.

The carriage 11 is comprised of six actuator arms 11a, 11b, 11c, 11d, 11e, and 11f (hereinafter referred to as "actuator arms 11a through 11f") formed in a stacked condition corresponding to the magnetic disks 30a through 30e, a bearing section 111 for a pivot cartridge 10 supported by the base 2A of the disk enclosure 2 and the cover, and a coil support 113 for holding a voice coil 112. To the bearing section 111, there is attached the pivot cartridge 10 for rotating the actuator arms 11a through 11f around a pivot shaft 9. Further, a voice coil yoke 19 forming the voice coil motor together with the voice coil 112 is provided to the base 2A on the backside of the bearing section 111. The voice coil yoke 19, which is described in the drawing with the upper part omitted while a part thereof remaining for the sake of simplification of the drawing, is disposed above and below the voice coil 112 with predetermined spaces, and is provided with a voice coil magnet formed of a permanent magnet attached inside the upper and lower parts thereof or inside the lower part thereof, thereby forming a magnetic field space.

The actuator arms 11*a*, 11*f* are provided with the HGA 10*a*, 10*j* attached to the tip portions thereof, respectively. Further, the actuator arm 11*b* is provided with the HGA 10*b*, 10*c*, the actuator arm 11*c* is provided with the HGA 10*d*, 10*e*, the actuator arm 11*d* is provided with the HGA 10*f*, 10*g*, and the actuator arm 11*e* is provided with the HGA 10*h*, 10*i* attached to the tip portions thereof, respectively.

Further, the base 2A is provided with a surrounding wall 21, and also with a shroud 14 disposed at the position not to inhibit the operation of the HSA 4 so as to partially surrounding the outer peripheries of the magnetic disks 30*a* through 30*e* from the side faces. The shroud 14 is formed from the vicinity of the ramp 8 to the vicinity of the voice coil yoke 19 so as to keep a little gap with the outer peripheries of the magnetic disks 30*a* through 30*e*. It should be noted that the vicinity of the ramp 8 in the shroud 14 becomes the upstream side of the shroud 14, and the vicinity of the voice coil yoke 19 in the shroud 14 becomes the downstream side of the shroud 14.

Further, the base 2A is provided with a recirculation filter 18 for catching the dust contained in the airflow flowing along the surrounding wall 21 of the base 2A on the upstream side of the ramp 8. The recirculation filter 18 is typically formed of nonwoven fabric made of polypropylene or the like.

Further, the base 2A is provided with the spoiler 15 disposed between the downstream side of the shroud 14 and the upstream side of the HSA 4 in order for weakening the flow rate of the airflow in the rotational direction caused by the rotation of the magnetic disks 30*a* through 30*e*. Specifically, the spoiler 15 is positioned in the vicinity of the coil support 113 of the HSA 4. As shown in FIG. 1(B), the spoiler 15 is composed of four wings 15*a*, 15*b*, 15*c*, and 15*d* (hereinafter referred to as "wings 15*a* through 15*d*") and a supporting section 16 for supporting the wings, and is formed in a stacked condition so that the wing 15*a* is inserted between the magnetic disks 30*a* and 30*b*, the wing 15*b* is inserted between the magnetic disks 30*b* and 30*c*, the wing 15*c* is inserted between the magnetic disks 30*c* and 30*d*, and the wing 15*d* is inserted between the magnetic disks 30*d* and 30*e*, respectively. It should be noted that no wing of the spoiler is disposed on the front side of the magnetic disk 30*a* or the reverse side of the magnetic disk 30*e* because the facing surfaces are stationary surfaces to cause the flow rate of the airflow to be low, and accordingly, the influence of the windage vibration is small even without the wings.

Further, as shown in FIG. 1(C), the wings 15*a* through 15*d* of the spoiler 15 are each formed by extending from the outer peripheral direction of the magnetic disks 30*a* through 30*e* towards the direction of the spindle shaft 7 while reducing the wing width. The greater the wing widths of the wings 15*a* through 15*d* are, the stronger the effect of reducing the flow rate of the airflow becomes. However, if the wing width is made too great, the air resistance increases, and the negative pressure caused on the downstream side of the wing increases accordingly. As a result, even if the windage vibration can be controlled, the dust flowing in between the magnetic disks increases, and accordingly, a negative effect by providing the spoiler has arisen in the magnetic disk of the related art. In the present embodiment, the wings 15*a* through 15*d* are each formed to have a wing width in a range of 2.7% through 2.9% of the circumferential lengths of the magnetic disks 30*a* through 30*e* in a range of two thirds of the wing length from a region 301 positioned in the outer circumference of each of the magnetic disks 30*a* through 30*e* in a direction towards the spindle shaft 7. The wing width at the region 301 positioned in the outer circumference denotes the distance between the two points where the vertical projections of the outer circumferences of the magnetic disks 30*a* through 30*e* to the wings 15*a* through 15*d* intersect with the edges of the wings 15*a* through 15*d*. By selecting the wing widths of the wings 15*a* through 15*d*, the windage vibration caused to the magnetic heads can be reduced, and the negative pressure caused downstream of the wings 15*a* through 15*d* can also be reduced to prevent the dust from flowing in on the surfaces of the magnetic disks. It should be noted that since the circumferential velocities of the magnetic disks varies depending on the positions on the magnetic disks in the radial direction, the lengths of the wings 15*a* through 15*d* of the spoiler 15 are determined in accordance with the relationships between the circumferential velocities of the magnetic disks and the positioning accuracy of the magnetic heads. Therefore, assuming that the required positioning accuracy is constant in the radial direction of the magnetic disks, it is necessary to make the greater the lengths of the wings 15*a* through 15*d*, the faster the circumferential velocities of the magnetic disks are, thereby making the wings reach the vicinity of the inner peripheries thereof.

Further, the wings 15*a* through 15*d* of the spoiler 15 are each preferably formed to have a streamlined shape or to have a rounded shape in a forward line 151 on the upstream side so to reduce the resistance of the airflow. By forming each of the wings 15*a* through 15*d* to have a streamlined shape or to have a rounded shape in the forward line 151 on the upstream side, variation in pressure of the air stream can be reduced, thus the negative pressure caused on the downstream side of the spoiler 15 can further be reduced.

Further, the wings 15*a* through 15*d* of the spoiler 15 can be provided with uneven shapes on the surfaces. By providing the uneven shapes in, for example, a striped manner in a direction perpendicular to the flow of the airflow, it becomes possible to forcedly transfer the laminar boundary layer into the turbulent boundary layer. Further, in order for generating a turbulent flow on the downstream side of the spoiler 15 to the extent of not disturbing the flow rate reduction effect of the airflow, the depths of the uneven shapes are preferably in a range of 0.1 mm through 0.2 mm assuming that the thicknesses of the wings 15*a* through 15*d* of the spoiler 15 are in a range of 0.5 mm through 0.6 mm. By thus providing the uneven shapes to the surfaces of the wings 15*a* through 15*d*, the pressure of the airflow on the downstream side of the spoiler 15 can be increased, thus the negative pressure caused on the downstream side of the spoiler 15 can further be reduced.

Further, as shown in FIGS. 1(A) and 1(B), a partition 17 for limiting the air flowing in a direction from the surrounding area of the outer peripheries of the magnetic disks 30*a* through 30*e* towards the spindle shaft 7 supporting the magnetic disks 30*a* through 30*e* can be disposed between the downstream side of the spoiler 15 and the upstream side of the HSA 4 along the outer circumferences of the magnetic disks 30*a* through 30*e*. By disposing the partition 17 at the present position, the flow of air flowing in from the surrounding area of the outer circumferences of the magnetic disks 30*a* through 30*e* to the areas on the surfaces of the magnetic disks positioned on the downstream side of the spoiler 15 can be limited. The partition 17 is formed integrally with the supporting section 16 as if the supporting section 16 is extended. By forming the partition 17 integrally with the supporting section 16 of the spoiler 15, downsizing as well as reduction of the number of components can be achieved, thus it becomes possible to be attached to a small space in such a magnetic disk drive with a small mounting space for a component.

Further, as shown in FIGS. 1(A) and 1(D), the filter 18 for catching the dust contained in the airflow can be disposed between the downstream side of the spoiler 15 and the upstream side of the HSA 4 along the outer circumferences of the magnetic disks 30a through 30e. By disposing the filter 18 at the present position, it becomes possible to catch the dust contained in the air flowing in from the surrounding area of the outer peripheries of the magnetic disks 30a through 30e to the areas on the surfaces of the magnetic disks. Nonwoven fabric made of polypropylene or the like is preferably used as the filter 18.

The airflow of the inside of the magnetic disk drive 1 thus configured will be explained. In the operation stopping state, the tabs 13a through 1j of the load beam 12a through 12j are positioned at the home positions in the ramp 8. In this case, when the magnetic disk drive 1 is activated, the spindle motor rotates the magnetic disks 30a through 30e. When the current is supplied to the voice coil 16 to rotate the HSA 4 towards the magnetic disks, the tabs move sliding the sliding surface of the ramp 8 and then detach from the ramp 8. Subsequently, the sliders move onto the recording surfaces of the magnetic disks, and are lifted by the airflow caused by the rotation of the magnetic disks 30a through 30e and flowing in between the magnetic disks 30a through 30e and the sliders.

In this case, as shown in FIGS. 2(A) and 2(B), the airflow in the rotational direction caused by the rotation of the magnetic disks 30a through 30e flows on the surfaces of the magnetic disks 30a through 30e and the gap between the outer circumferences of the magnetic disks 30a through 30e and the shroud 14 in the area where the shroud 14 is provided. Then, on the downstream side of the shroud 14, a part thereof flows along the surrounding wall 21 of the base 2A, or flows through the gaps of the HSA 4 or of the voice coil magnets in the area between the surrounding wall 21 and the outer circumferences of the magnetic disks 30a through 30e. The other thereof flows along the surfaces of the magnetic disks 30a through 30e to pass through the wings 15a through 15d of the spoiler 15. The airflow flowing on the surfaces of the magnetic disks 30a through 30e in the area where the shroud 14 is provided is filtered by the recirculation filter 18 to contain only a little dust, and accordingly, the airflow with only a little dust passes through the wings 15a through 15d of the spoiler 15. On the other hand, the airflow flowing from the downstream side of the shroud 14 through the gaps of the HSA 4 or of the voice coil magnets in the area between the surrounding wall 21 and the outer circumferences of the magnetic disks 30a through 30e contains a lot of dust because it flows in the vicinity of the HSA 4 or other components to which the dust is attached.

It should be noted that the spoiler 15, which is characterized by the shapes of the wings 15a through 15d, can reduce the air resistance thereby reducing the negative pressure caused on the downstream side of the wings 15a through 15d compared to the wings of the spoiler in the related art. Therefore, the flow of the air containing a lot of dust and flowing in from the outside of the magnetic disks 30a through 30e to the areas on the surfaces of the magnetic disks can be controlled. Further, as shown in FIG. 2(A), in the case in which the partition 17 is disposed between the downstream side of the wings 15a through 15d of the spoiler 15 and the upstream side of the HSA 4 along the outer circumferences of the magnetic disks 30a through 30e, the flow of the air containing a lot of dust and flowing in from the surrounding area of the outer circumferences of the magnetic disks 30a through 30e to the areas on the surfaces of the magnetic disks positioned on the downstream side of the wings 15a through 15d of the spoiler 15 can be limited.

Further, as shown in FIG. 2(B), in the case in which the filter 18 is disposed between the downstream side of the wings 15a through 15d of the spoiler 15 and the upstream side of the HSA 4 along the outer circumferences of the magnetic disks 30a through 30e, the dust can be caught from the air containing a lot of dust and flowing in from the surrounding area of the outer circumferences of the magnetic disks 30a through 30e to the areas on the surfaces of the magnetic disks. Therefore, reduction of the dust can be achieved by the dust catching function by the filter 18 in addition to the air flow-in control function by the spoiler 15.

Further, although the airflow flowing along the surrounding wall 21 of the base 2A and the airflow flowing through the gaps of the HSA 4 or of the voice coil magnets in the area between the surrounding wall 21 and the outer circumferences of the magnetic disks 30a through 30e contain a lot of dust attached to the HSA 4 or other components, the dust is caught by the recirculation filter 18 disposed on the upstream side of the ramp 8. Therefore, the dust is significantly reduced from the airflow flowing in from the upstream side of the shroud 14 to the gap between the outer circumferences of the magnetic disks 30a through 30e and the shroud 14 or to the areas on the surfaces of the magnetic disks 30a through 30e. It should be noted that when stopping the operation, the voice coil motor is driven to rotate the HSA 4 towards the ramp, thus rotating the tabs 13a through 13j to the home positions in the ramp 8.

Further, although the spoiler 15 is fixed to the base 2A in the embodiment of the magnetic disk drive 1 described above, the structure is not limited thereto, but the structure in which the spoiler can be retracted from the area on the magnetic disks when the magnetic disks 30a through 30e stop or start rotating can also be adopted. Specifically, the wings 15a through 15d can rotatably be provided alone independently of the supporting section 16, or the wings 15a through 15d can rotatably be provided to the base 2A together with the supporting section 16. As the rotatable mechanism, various rotating mechanisms well known in the art can be adopted. Inside the disk enclosure 2, more dust is suspended especially in the outside of the magnetic disks 30a through 30e immediately after starting the magnetic disk 30a through 30e than when the magnetic disks 30a through 30e are in the stopped state or in the steady rotation. If the dust flows in between the magnetic disks, the dust is pinched between the magnetic head and the magnetic disk, which damages the magnetic disk to loose the recorded data, or damages the magnetic head to cause weakening of the output. Therefore, the dust to be attached to the surfaces of the magnetic disks 30a through 30e can be reduced by preventing the air, which is in the condition immediately after the starting-up, and accordingly contains a lot of dust, from flowing in between the magnetic disks by retracting the spoiler 15 from the area above the magnetic disks in the starting-up of the magnetic disks 30a through 30e.

Figures 3A, 3B, 3C:
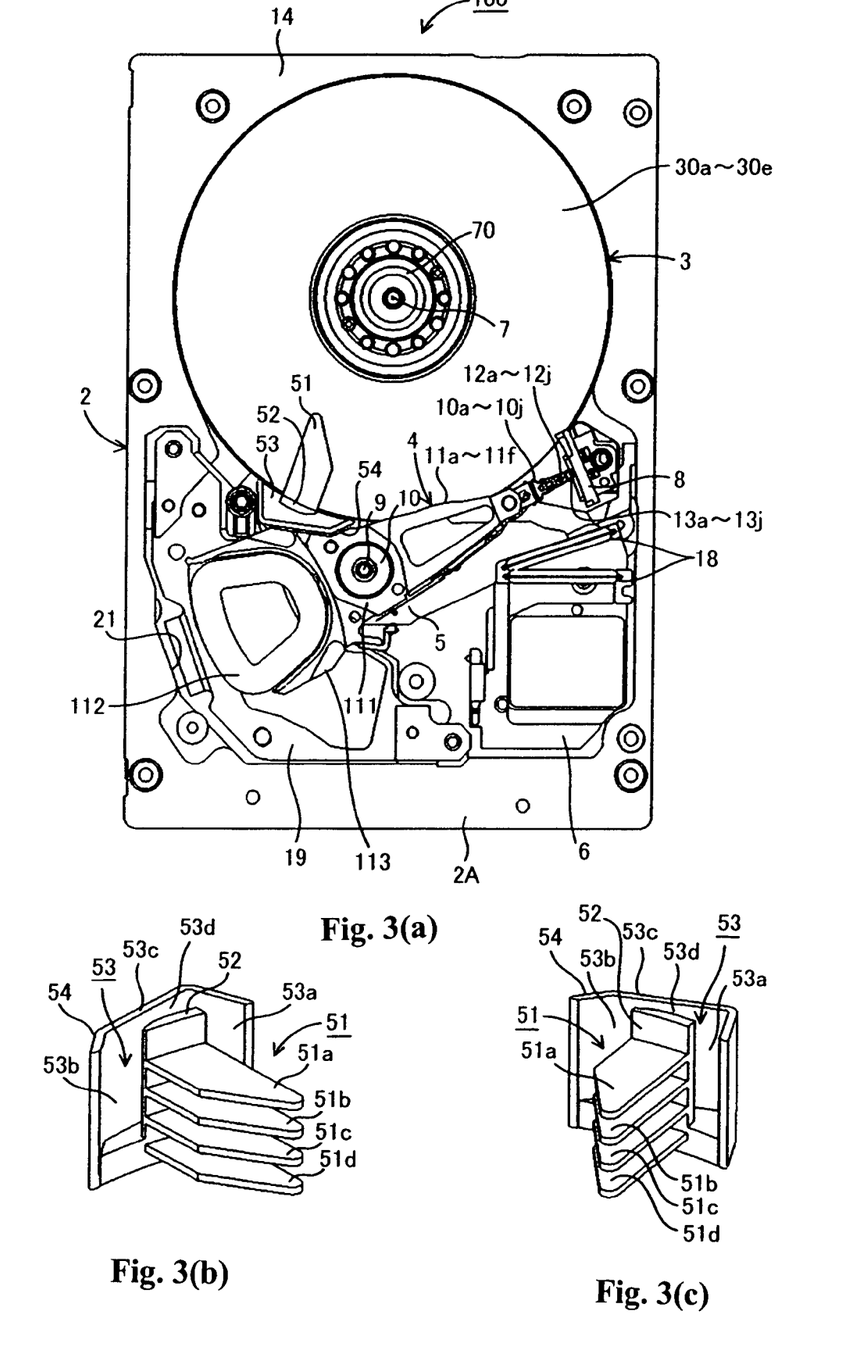
FIGS. 3(A)-3(C) are explanatory diagrams showing the magnetic disk drive according to another of the best modes of the rotating disk type storage device of embodiments of the present invention.
Figure 4A:
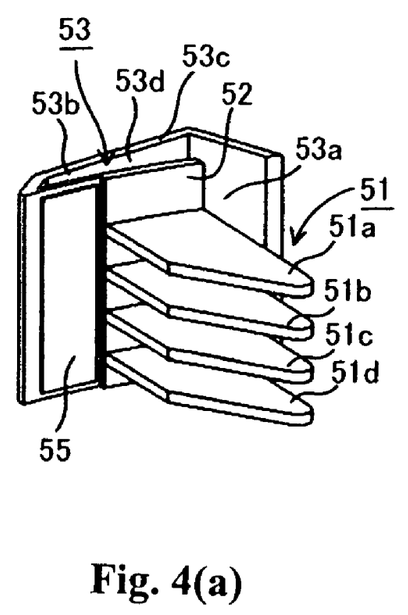
FIGS. 4(A) and 4(B) are explanatory diagrams showing the spoiler, the air introducing guide, and the filter used for the magnetic disk drive shown in FIG. 3.
Figure 4B:
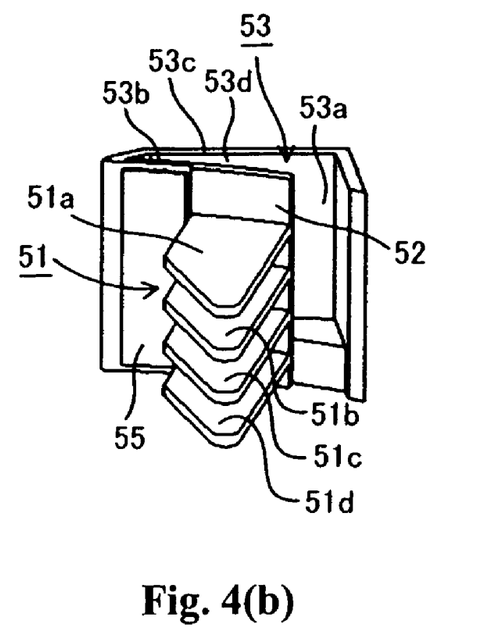
Figure 5A:
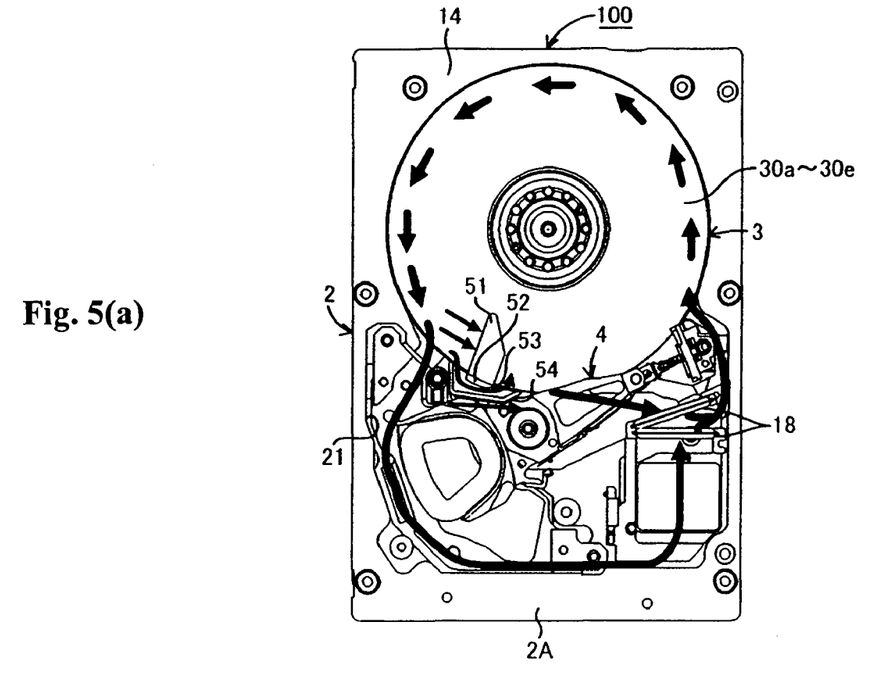
FIGS. 5(A) and 5(B) are schematic views showing a flow path of the airflow of the magnetic disk drive shown in FIG. 3.
Figure 5B:
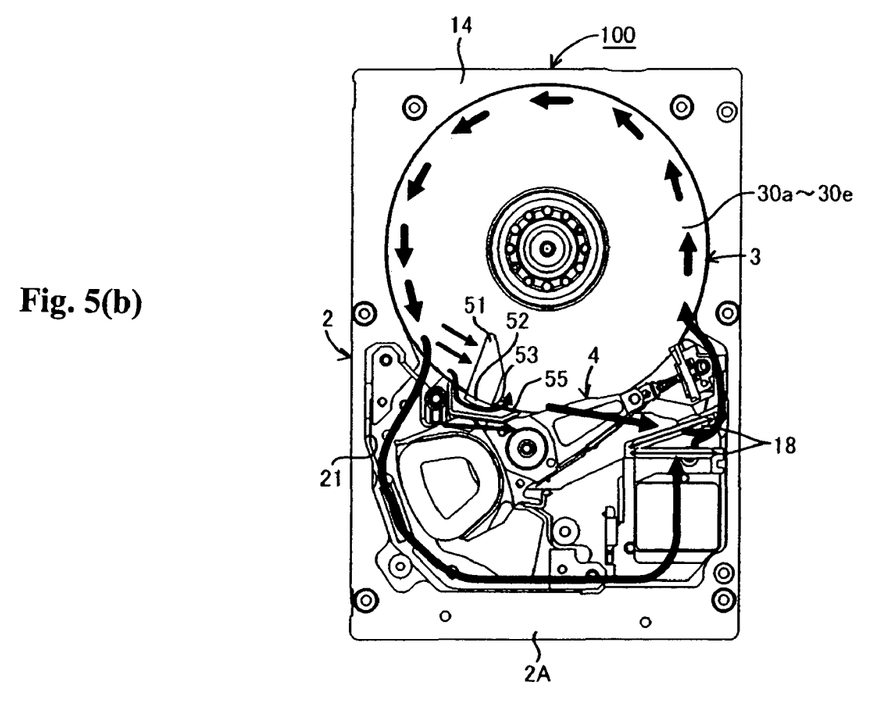

Further, in the embodiment described above, in order for reducing the windage vibration of the magnetic head as well as reducing the dust flowing in on the downstream side of the wings 15a through 15d of the spoiler 15, the shape of the spoiler is characterized, the partition 17 is used, or the filter 18 is used. In another example, as shown in FIG. 3, a part of the airflow flowing from the downstream side of the shroud 14 to the upstream side of the spoiler is led to the downstream side while preventing the part of the airflow from passing through the wings of the spoiler, thereby reducing the negative pressure on the downstream side of the spoiler. FIGS. 3(A)-3(C) are diagrams showing the magnetic disk drive according to another embodiment of the present invention, wherein FIG. 3(A) is a plan view showing a schematic configuration of the magnetic disk drive, FIG. 3(B) is a perspective view of the spoiler and an air introducing guide, FIG. 3(C) is a perspective view of the spoiler and the air introducing guide viewed from a different direction from that of FIG. 3(B). It should be noted that in FIG. 3(A), since the same reference numerals as in FIG. 1(A) denote the same elements, the explanations therefor will be omitted. FIGS. 4(A) and 4(B) are diagrams showing the spoiler, the air introducing guide, and the filter used in the magnetic disk drive shown in FIGS. 3(A)-3(C), wherein FIG. 4(A) is a perspective view, and FIG. 4(B) is a perspective view viewed from a different direction from that of FIG. 4(A). FIGS. 5(A) and 5(B) are schematic diagrams showing a flow path of an airflow according to the magnetic disk drive shown in FIGS. 3(A)-3(C), wherein FIG. 5(A) is a plan view of the magnetic disk drive using the spoiler and the air introducing guide, and FIG. 5(B) is a plan view of the magnetic disk drive using the spoiler, the air introducing guide, and the filter.

As shown in FIG. 3(A), in the magnetic disk drive, which is another mode for carrying out embodiments of the present invention, the base 2A is provided with a spoiler 51 disposed at the same position as the spoiler 15 shown in FIG. 1 described above in order for weakening the flow rate of the airflow hitting the actuator arms 11a through 11f or the HGA 10a through 10j. The wings of the spoiler 51 can have shapes well known to the public, and as shown in FIGS. 3(B) and 3(C), the spoiler is composed of four wings 51a, 51b, 51c, and 51d (hereinafter referred to as "wings 51a through 51d") and a supporting section 52 for supporting the wings.

Further, the base 2A is provided with an air introducing guide 53, which guides a part of the airflow flowing from the downstream side of the shroud 14 from the upstream side of the wings 51a through 51d to the downstream side thereof without passing through the wings 51a through 51d of the spoiler 51, disposed along the outer circumferences of the magnet disks 30a through 30e. As shown in FIGS. 3(B) and 3(C), the air introducing guide 53 is composed of an introduction port 53a for the airflow disposed towards the upstream side of the wings 51a through 51d of the spoiler 51, a discharge port 53b for the airflow disposed towards the downstream side of the spoiler 51, and a flow path 53d formed of the supporting section 52 of the spoiler 51 and a wall 53c and for connecting the introduction port 53a and the discharge port 53b to each other. Since an airflow containing a little dust flows on the upstream side of the wings 51a through 51d of the spoiler 51, the air introducing guide 53 can lead the airflow with a little dust to the downstream side of the wings 51a through 51d of the spoiler 51. Therefore, by reducing the negative pressure caused on the downstream side of the wings 51a through 51d of the spoiler 51 using the air with a little dust, the dust flowing in on the downstream side of the wings 51a through 51d can be reduced.

Further, it is possible to provide a partition 54, which limits the air flowing in from the surrounding area of the outer circumferences of the magnetic disks 30a through 30e to the areas on the surfaces of the magnetic disks, disposed between the downstream side of the wings 51a through 51d of the spoiler 51 and the upstream side of the HSA 4. The partition 54 is formed integrally with the wall 53c forming the flow path 53d of the air introducing guide 53 together with the supporting section 52 of the spoiler 51. By disposing the partition 54 at the present position, the flow of air flowing in from the surrounding area of the outer circumferences of the magnetic disks 30a through 30e to the areas on the surfaces of the magnetic disks positioned on the downstream side of the wings 51a through 51d of the spoiler 51 can be limited.

Further, as shown in FIGS. 4(A) and 4(B), a filter 55 for catching the dust in the airflow passing through the air introducing guide 53 is preferably disposed in the discharge port 53b or the flow path 53d of the air introducing guide 53. By disposing the filter 55 at the present position, the dust can further be caught from the airflow with a little dust led by the air introducing guide 53.

By forming the spoiler 51, the air introducing guide 53, and the partition 54 integrally with each other, reduction of the number of components can be achieved, and further it becomes possible to be attached to a small space in such a downsized magnetic disk drive with a small mounting space for a component.

The airflow in the magnetic disk drive 100 thus configured will be explained. In the operation stopping state, the tabs 13a through 13j of the load beam 12a through 12j are positioned at the home positions in the ramp 8. In this case, when the magnetic disk drive 100 is activated, the spindle motor rotates the magnetic disks 30a through 30e. When the current is supplied to the voice coil 16 to rotate the HSA 4 towards the magnetic disks, the tabs 13a through 13j slide the sliding surface of the ramp 8 and then detach from the ramp 8. Subsequently, the sliders move onto the recording surfaces of the magnetic disks, and are lifted utilizing the air bearing formed by the airflow caused by the rotation of the magnetic disks 30a through 30e and flowing in between the magnetic disks 30a through 30e and the sliders. The states of the airflow in the portion where the shroud 14 is disposed and the airflow flowing along the surrounding wall 21 are the same as the states explained with reference to FIG. 2.

The airflow is decelerated while passing through the wings 51a through 51d of the spoiler 51, and at the same time, the negative pressure is caused on the downstream side thereof. However, since a part of the airflow on the upstream side of the wings 51a through 51d of the spoiler 51 flows in the introduction port 53a of the air introducing guide 53, the part of the airflow flows in from the discharge port 53b of the air introducing guide 53 to the downstream side of the wings 51a through 51d of the spoiler 51. If the airflow with a little dust flows into the downstream side of the wings 51a through 51d, it is possible to reduce the negative pressure caused on the downstream side of the wings 51a through 51d as well as to reduce the dust flowing into the downstream side of the wings 51a through 51d. The airflow flowing through the air introducing guide 53 includes the airflow flowing through an area between the shroud 14 and the outer circumferences of the magnetic disks 30a through 30e and the airflow flowing from the outer circumferential side surfaces of the magnetic disks 30a through 30e to the outside of the outer circumferences thereof.

Further, as shown in FIG. 5(A), in the case in which the partition 54 is disposed between the downstream side of the wings 51a through 51d of the spoiler 51 and the upstream side of the HSA 4, the airflow flowing in from the surrounding area of the outer circumferences of the magnetic disks 30a through 30e to the area on the surfaces of the magnetic disks positioned on the downstream side of the wings 51a through 51d of the spoiler 51 can be limited. Since the airflow includes a lot of dust, the partition 54 can reduce the dust flowing into the downstream side of the wings 51a through 51d of the spoiler 51.

Further, as shown in FIG. 5(B), if the filter 55 is disposed between the downstream side of the wings 51a through 51d of the spoiler 51 and the upstream side of the HSA 4, the dust can be caught from the air, which flows in from the surrounding area of the outer circumferences of the magnetic disks 30a through 30e to the areas on the surfaces of the magnetic disks and contains a lot of dust, and accordingly, the further reduction of the dust can be achieved by a synergetic effect with the dust reduction function of the air introducing guide 53.

Further, although the airflow flowing through the gaps of the HSA 4 or of the voice coil magnets in the area between the surrounding wall 21 and the outer circumferences of the magnetic disks 30a through 30e contains a lot of dust attached to the HSA 4 or other components, the dust is caught by the recirculation filter 18 disposed on the upstream side of the ramp 8. Therefore, the dust is significantly reduced from the airflow flowing in from the upstream side of the shroud 14 to the gap between the outer circumferences of the magnetic disks 30a through 30e and the shroud 14 or to the areas on the surfaces of the magnetic disks 30a through 30e. It should be noted that when stopping the operation, the voice coil motor is driven to rotate the HSA 4 towards the ramp, thus rotating the tabs 13a through 13j to the home positions in the ramp 8.

Further, in the embodiment of the magnetic disk 100 described above, by adopting the wings 15a, 15b, 15c, and 15d of the spoiler 15 shown in FIGS. 1(A), 1(B), 1(C), and 1(D) to the spoiler 51, the negative pressure caused on the downstream side of the spoiler can be reduced, and accordingly, the further reduction of the dust can be achieved by the synergetic effect with the dust reduction function of the air introducing guide 52.

Further, although the spoiler 51 is fixed to the base 2A in the embodiment of the magnetic disk drive 100 described above, the structure is not limited thereto, but the structure in which the spoiler can be retracted from the area on the magnetic disks when the magnetic disks 30a through 30e stop or start rotating can also be adopted. Specifically, the wings 51a through 51d can rotatably be provided alone independently against the supporting section 52, or the wings 51a through 51d can rotatably be provided to the base 2A together with the supporting section 52. As the rotatable mechanism, various rotating mechanisms well known in the art can be adopted. By adopting such a structure, similarly to the case with the magnetic disk drive 1, it is possible to prevent the air, which is in the condition immediately after the starting-up, and accordingly contains a lot of dust, from flowing in between the magnetic disks by retracting the spoiler 51 from the areas above the magnetic disks in the starting-up of the magnetic disks 30a through 30e.

Incidentally, a so-called disk runout, which is a phenomenon showing a relative vibration between a head and a disk medium, is known as one of the factors for degrading the positioning accuracy of the head. The disk runout includes a repeatable runout (RRO; a first-order runout) appearing repeatedly in sync with the revolution of the spindle motor for rotationally driving the disk and a non-repeatable runout (NRRO) appearing not in sync with the revolution thereof, either of them becoming a cause of enlarging the position error signal PES.

Subsequently, the result of a comparative experiments on the number of dust particles on the surface of the magnetic disk and the NRRO of the magnetic disk performed using the magnetic disk drive 1 equipped with the spoiler 15 according to the present embodiment, a magnetic disk drive equipped with a conventional spoiler, and a magnetic disk drive without a spoiler will be explained.

Figure 6A:
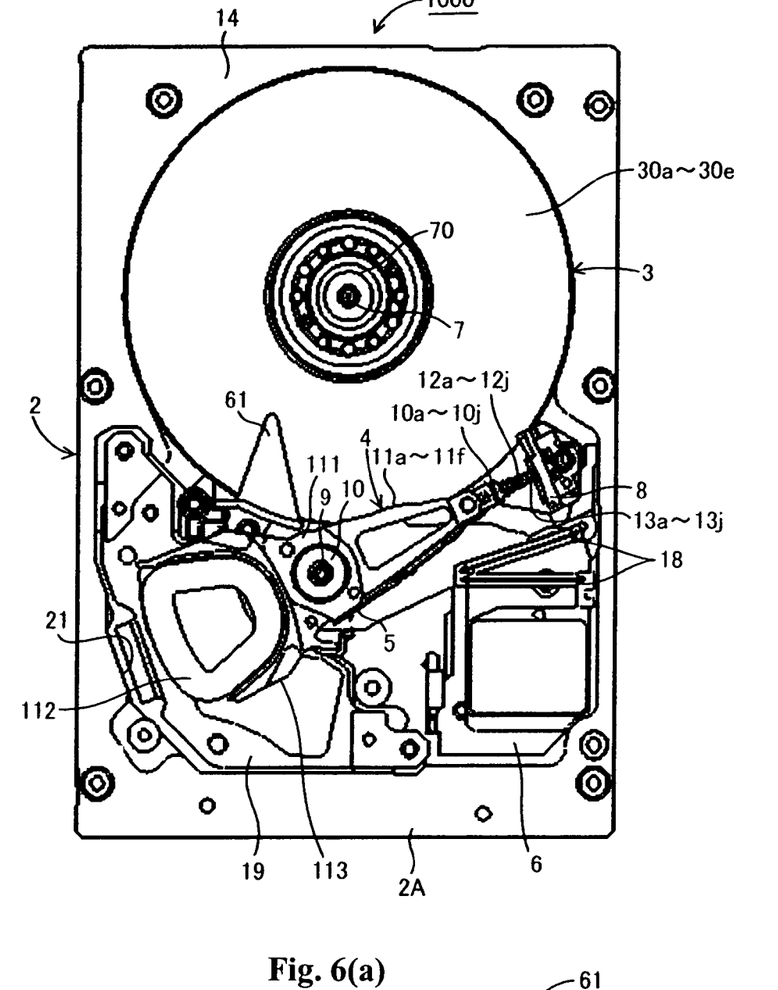
FIGS. 6(A)-6(C) are explanatory views showing the conventional magnetic disk drive.
Figure 6B:
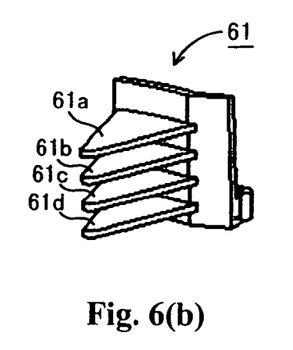
Figure 6C:
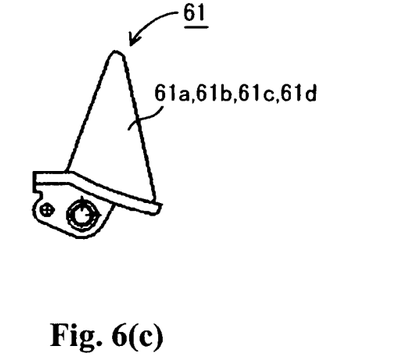
Figure 7:
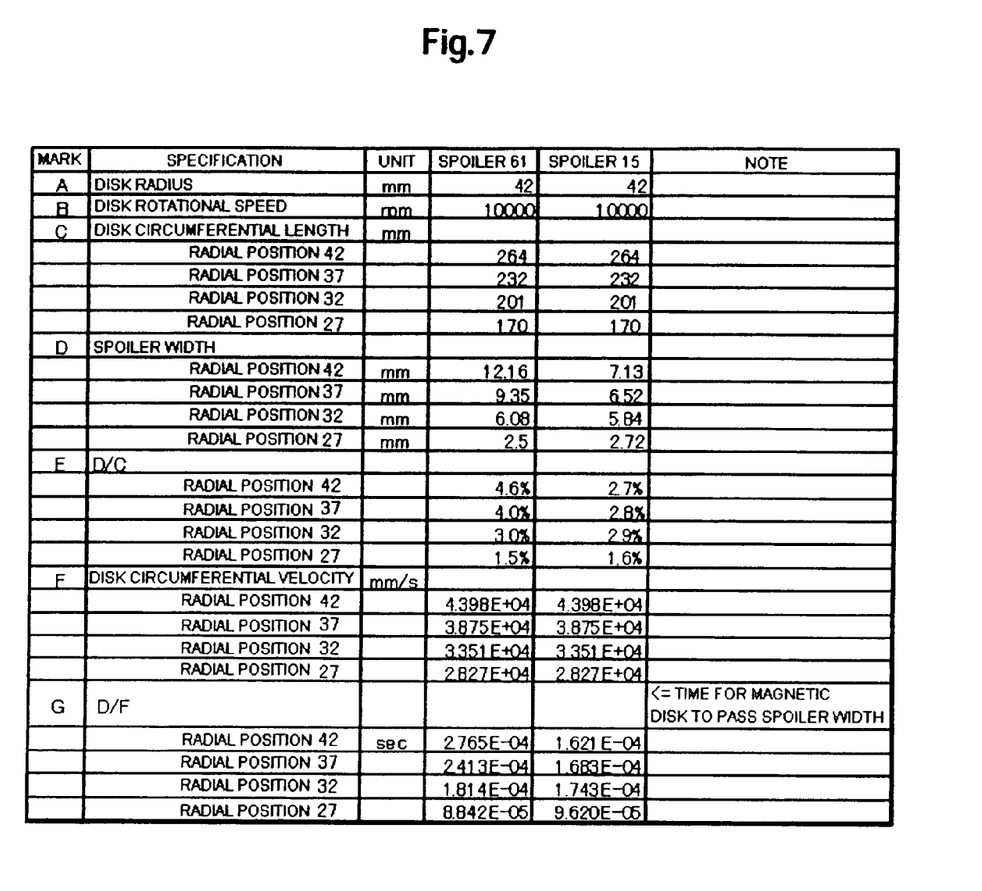
FIG. 7 is a chart showing definition items of the magnetic disk drive equipped with the spoiler according to embodiments of the present invention and the magnetic disk drive equipped with the conventional spoiler.

The magnetic disk drives used in the experiment are all compliant to the 3.5-inch standard (i.e., 84 mm in disk diameter; 10,000 RPM in disk rotational speed). FIGS. 6(A)-6(C) are diagrams showing a conventional magnetic disk drive, wherein FIG. 6(A) is a plan view showing schematic configuration of the magnetic disk drive, FIG. 6(B) is a perspective view of the spoiler, and FIG. 6(C) is a plan view of the spoiler. FIG. 7 is a comparative table of the magnetic disk drive equipped with a conventional spoiler 61 and the magnetic disk drive equipped with the spoiler 15 according to the present embodiment. It should be noted that in FIG. 7, RADIAL POSITION denotes a distance measured from the rotational center of the magnetic disk in the radial direction.

As shown in FIG. 6(A), the conventional magnetic disk drive 1000 is different from the magnetic disk drive 1 of embodiments of the present invention only in the shape of the spoiler 61, and the same reference numerals as those in FIG. 1(A) denote the same elements, and accordingly, the explanations therefor will be omitted. The spoiler 61 is disposed between the downstream side of the shroud 14 and the upstream side of the HSA 4 similarly to the magnetic disk drive 1 of embodiments of the present invention. Specifically, it is positioned in the vicinity of the coil support 113 of the HSA 4. As shown in FIG. 6(B), the spoiler 61 is composed of four wings 61a, 61b, 61c, and 61d (hereinafter referred to as "wings 61a through 61d"), and is formed in a stacked condition so that the wing 61a is inserted between the magnetic disks 30a and 30b, the wing 61b is inserted between the magnetic disks 30b and 30c, the wing 61c is inserted between the magnetic disks 30c and 30d, and the wing 61d is inserted between the magnetic disks 30d and 30e, respectively.

Further, as shown in FIG. 6(C), the wings 61a through 61d of the spoiler 61 are each formed by extending from the outer peripheral direction of the magnetic disks 30a through 30e towards the direction of the spindle shaft 7 while reducing the width of the wing. Specifically, as shown in FIG. 7, the rate (D/C) of the widths of the wings 61a through 61d to the circumferential length at a radial position of 42 mm of the magnetic disks 30a through 30e is 4.6%, that to the circumferential length at a radial position of 37 mm is 4.0%, that to the circumferential length at a radial position of 32 mm is 3.0%, that to the circumferential length at a radial position of 27 mm is 1.5%, and the planar shape of each of the wings 61a through 61d is a triangle with an apex located at a redial position of 26 mm. As described above, the outer the circumferential position on the magnetic disk is, the larger the D/C becomes, because the circumferential velocity becomes maximum at the outer circumference of the magnetic disk resulting in the high flow rate of the airflow, which means that the larger the D/C is, the more the airflow can be decelerated.

On the other hand, as shown in FIG. 7, in the case with the spoiler 15 used for the magnetic disk drive 1 of the present invention, the rate (D/C) of the widths of the wings 15a through 15d to the circumferential length at a radial position of 42 mm (the region 301 of each of the wings 15a through 15d located at the outer circumferences of the magnetic disks 30a through 30e) of the magnetic disks 30a through 30e is 2.7%, that to the circumferential length at a radial position of 37 mm is 2.8%, that to the circumferential length at a radial position of 32 mm is 2.9%, that to the circumferential length at a radial position of 27 mm is 1.6%, and the apex is located at a redial position of 26 mm. The wing length from the radial position of 42 mm to the radial position of 32 mm is two thirds of the length from the radial position of 42 mm to the apex, and in this range, the wings of the spoiler 15 is formed to have a rate (D/C) of the wing width to the corresponding disk circumferential length of 2.7 % through 2.9%, which is substantially constant with respect to a standard of 2.8 %, and have a tolerance within a range of ±0.1. Further, the wings 15a through 15d of the spoiler 15 are each formed so that the upstream side edge thereof extends substantially straight in a direction from the surrounding area of the outer circumferences of the magnetic disks 30a through 30e towards the spindle shaft 7, and the downstream side edge thereof extends in the direction while coming closer to the upstream side edge to gradually decrease the width thereof.

Firstly, a measuring method of the number of dust particles on a magnetic disk will be explained. As the measuring device for measuring the number of dust particles on a magnetic disk, a wafer sampler (WS1000), the gas analyzer, a product of Yokogawa Electric Corporation was used. As the sample of the dust particles, aluminum oxide ($Al_2O_3$) of 0.5 μm/0.05 mg was used.

The measuring procedure is as follows.

(1) The cover of the disk enclosure 2 of the magnetic disk drive is removed.

(2) The aluminum oxide powder with a particle size of 0.5 μm is put on the surface of a disk clamp for clamping the magnetic disk as much as 0.05 mg.

(3) The cover of the disk enclosure 2 of the magnetic disk drive is attached.

(4) The magnetic disks 30a through 30e are rotated at a rotational speed of 10 krpm for three minutes. In this case, the magnetic heads are set in unloaded conditions.

(5) After stopping the rotation of the magnetic disks 30a through 30e, the cover of the disk enclosure 2 of the magnetic disk drive is removed to disassemble the magnetic disks 30a through 30e.

(6) A specified position of each of the front surface and the reverse surface of each of the magnetic disks is blown with air, and the aluminum oxide thus stirred up is suctioned by a suction device. In this case, the disassembled magnetic disks are each rotated on a dedicated jig. The aluminum oxide suctioned by the suction device is measured by the wafer sampler (WS1000).

Figure 8A:
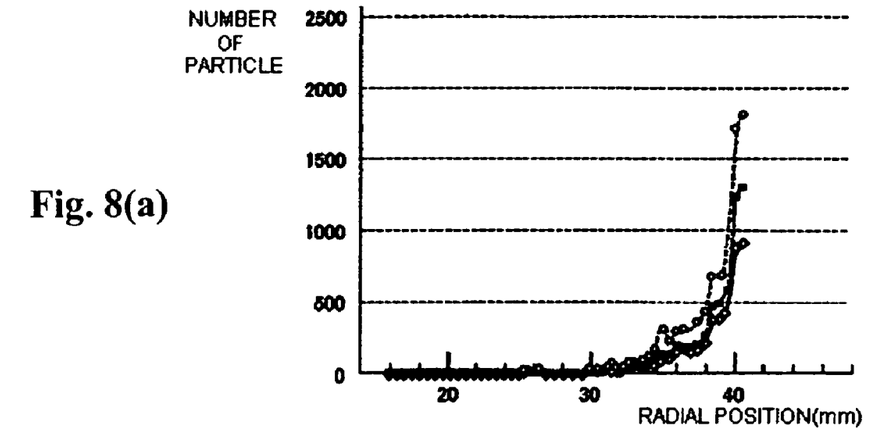
FIGS. 8(A)-8(C) are charts showing the measurement results of the dust samples caught from a predetermined magnetic disk in the magnetic disk drive without the spoiler, the magnetic disk drive equipped with the conventional spoiler, and the magnetic disk drive equipped with the spoiler according to embodiments of the present invention in the form of a graph.
Figure 8B:
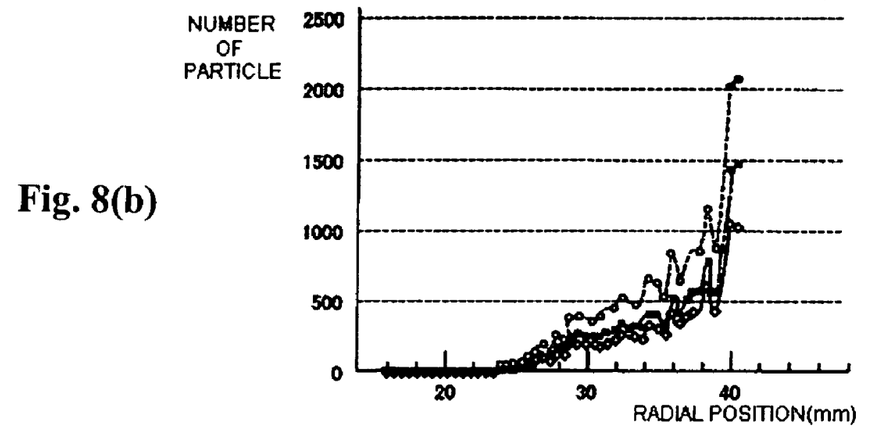
Figure 8C:
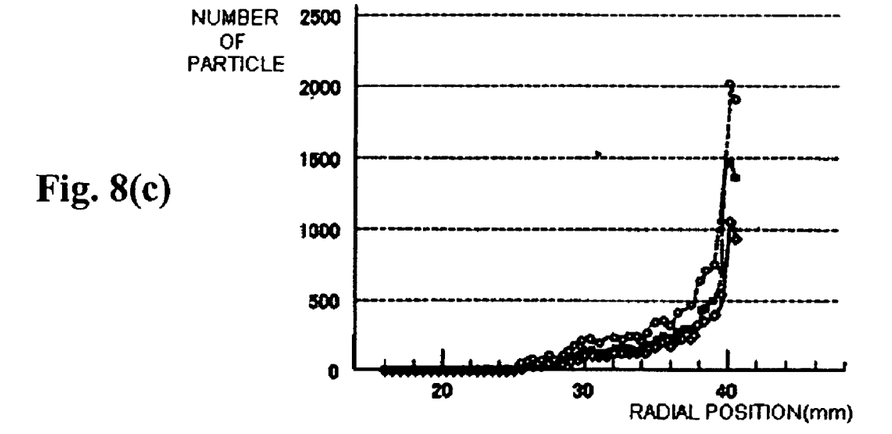

The measurement of the number of particles of the aluminum oxide was performed for every predetermined radial position of the magnetic disk as shown in FIGS. 8(A), 8(B), and 8(C). FIG. 8(A) shows data of the magnetic disk device without the spoiler, FIG. 8(B) shows data of the magnetic disk device equipped with the conventional spoiler 61, and FIG. 8(C) shows data of the magnetic disk device equipped with the spoiler 15 according to the present embodiment. It should be noted that either of the spoilers is measured while mounted on a single magnetic disk drive. Further, in either of the data, what is related to the surface of the magnetic disk 30b, which is located the second highest position, is shown as an exemplification of the measurement.

Figure 9:
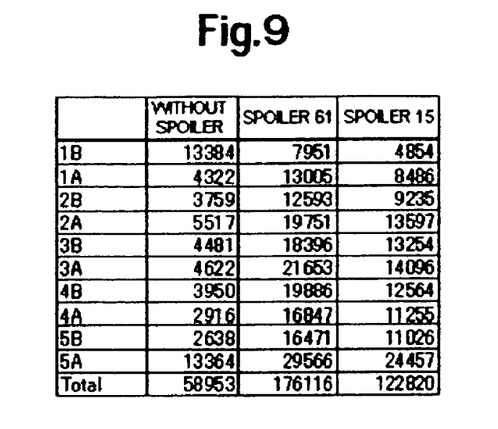
FIG. 9 is a chart showing the measurement results of the dust samples caught from magnetic disks in the magnetic disk drive without the spoiler, the magnetic disk drive equipped with the conventional spoiler, and the magnetic disk drive equipped with the spoiler according to embodiments of the present invention.

FIG. 9 shows the measurement result of the number of particles of the aluminum oxide. In FIG. 9, 1A and 1B correspond to the magnetic disk 30a located at the highest position, 2A and 2B correspond to the magnetic disk 30b located at the second highest position, 3A and 3B correspond to the magnetic disk 30c located at the third highest position, 4A and 4B correspond to the magnetic disk 30d located at the fourth highest position, and 5A and 5B correspond to the magnetic disk 30e located at the lowest position, and A denotes the front surface of the magnetic disk while B denotes the reverse surface of the magnetic disk. According to the measurement results, in the magnetic disk drive without the spoiler, the total number of particles of the aluminum oxide attached to either of the front and reverse surfaces of all of the magnetic disks was 58953 pieces, in the magnetic disk drive equipped with the conventional spoiler 61, the total number of particles of the aluminum oxide attached to either of the front and reverse surfaces of all of the magnetic disks was 176116 pieces, and in the magnetic disk drive equipped with the spoiler 15 according to the present embodiment, the total number of particles of the aluminum oxide attached to either of the front and reverse surfaces of all of the magnetic disks was 122820 pieces.

From the measurement results, it was found that the magnetic disk drive equipped with the spoiler 15 had the greater total number of the aluminum oxide than the magnetic disk drive without the spoiler, but has the smaller total number of the aluminum oxide than the magnetic disk drive equipped with the spoiler 61. Therefore, it was confirmed that the spoiler 15 could reduce the dust better than the spoiler 61.

Subsequently, a measuring method of the NRRO of a magnetic disk will be explained. The NRRO of a magnetic disk is obtained by performing signal processing on the signals from the magnetic heads equipped respectively to the ten HGA of the HSA. It should be noted that the measurement is performed while the magnetic heads are located at the outermost circumferential position of the magnetic disk.

Figure 10:
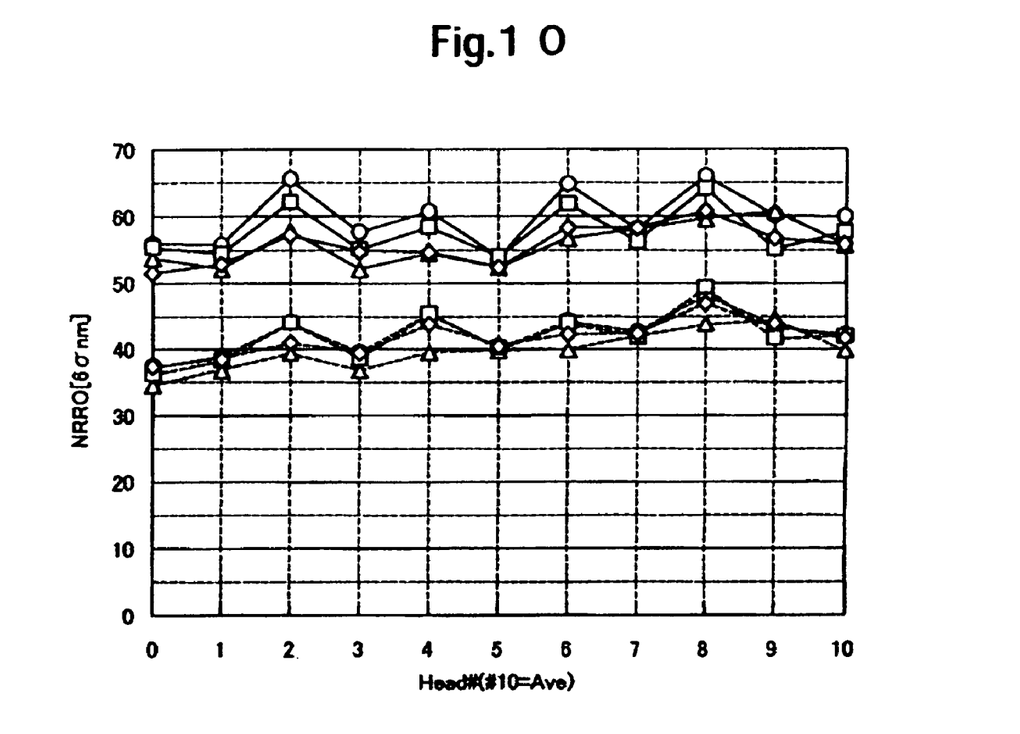
FIG. 10 is a chart showing a graph comparatively showing the magnetic disk drive without the spoiler and the magnetic disk drive equipped with the spoiler according to embodiments of the present invention using the NRRO values.

FIG. 10 is a graph comparatively showing the magnetic disk drive without the spoiler and the magnetic disk drive equipped with the spoiler 15 according to the present embodiment using the NRRO values, wherein the vertical axis represents the value of the NRRO [6 σnm], and in the horizontal axis the numerals 0 through 9 respectively denote the ten magnetic heads, and the numeral 10 denotes the average values of the ten magnetic heads. The solid line shows the values of the magnetic disk drive without the spoiler, and the dotted line shows the values of the magnetic disk drive equipped with the spoiler 15, each has four kinds of measuring samples. It should be noted that in order for maintaining the positioning accuracy, the NRRO needs to have a smaller value than 58 [6 σnm].

As is understood from the graph shown in FIG. 10, the magnetic disk drive without the spoiler has more than one magnetic head showing the NRRO no smaller than 58 [6 σnm], while in the magnetic disk drive equipped with the spoiler 15, all of the magnetic heads become smaller than 58 [6 σnm]. Therefore, it was found that the magnetic disk drive equipped with the spoiler 15 had the positioning accuracy of the magnetic head within the allowable range.

Figure 11:
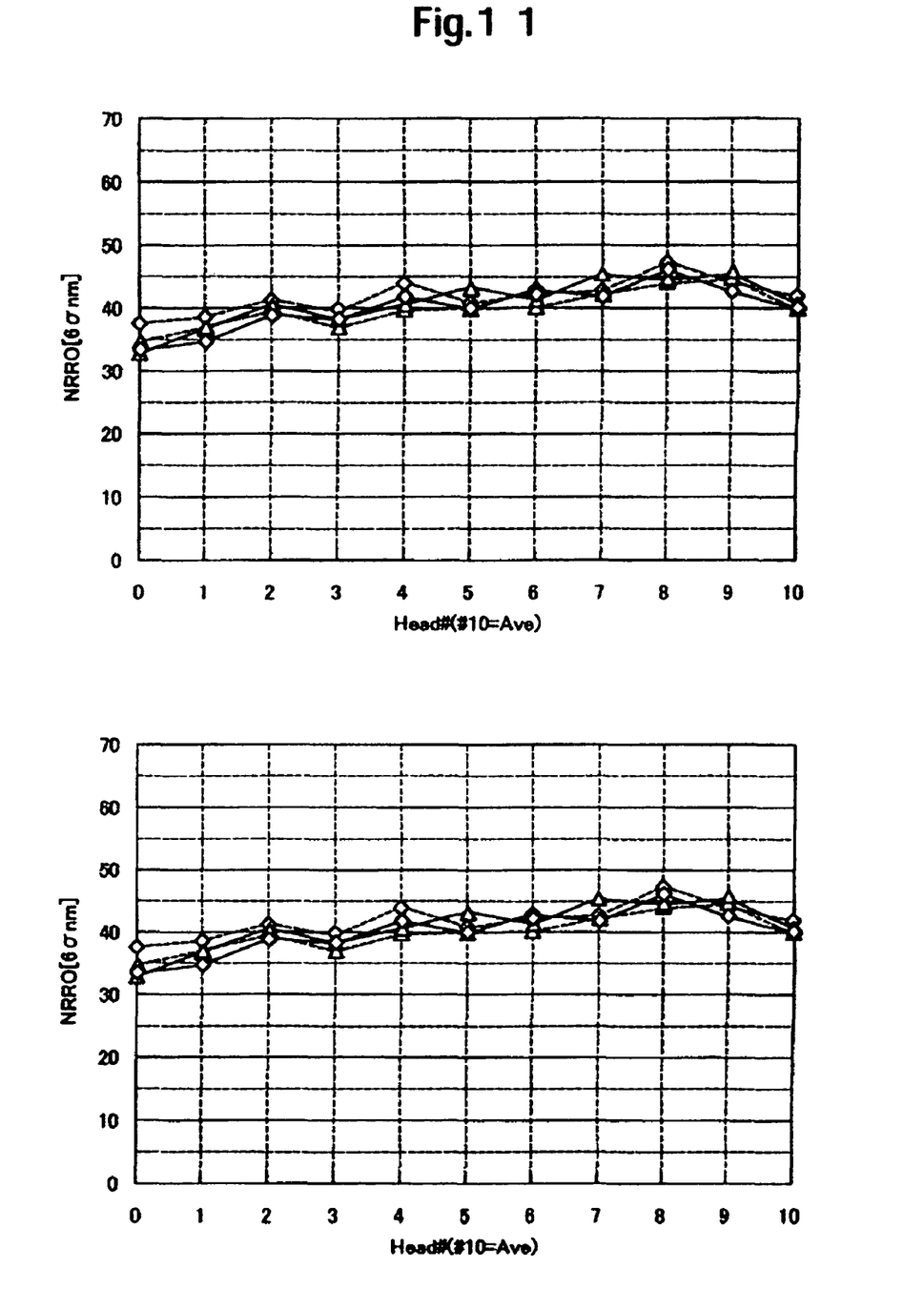
FIG. 11 is a chart showing a graph comparatively showing the magnetic disk drive equipped with the spoiler according to embodiments of the present invention and the magnetic disk drive equipped with the conventional spoiler using the NRRO values.

FIG. 11 is a graph comparatively showing the magnetic disk drive equipped with the conventional spoiler 61 and the magnetic disk drive equipped with the spoiler 15 according to the present embodiment using the NRRO values, wherein the vertical axis represents the value of the NRRO [6 σnm], and in the horizontal axis the numerals 0 through 9 respectively denote the ten magnetic heads, and the numeral 10 denotes the average values of the ten magnetic heads. The solid line shows the values of the magnetic disk drive equipped with the spoiler 15, and the dotted line shows the values of the magnetic disk drive equipped with the spoiler 61, each has two kinds of measuring samples.

As is understood from the graph shown in FIG. 11, in either of the magnetic disk drives, all of the magnetic heads had the NRRO smaller than 58 [6 σnm], and accordingly, it was found that the magnetic disk drive equipped with the spoiler 15 exerted the effect of reducing the windage vibration of the magnetic head like the magnetic disk drive equipped with the spoiler 61.

Therefore, it could be confirmed that the magnetic disk drive equipped with the spoiler 15 according to the present embodiment could effectively satisfy both of the function of controlling the flow rate of the airflow, and the function of reducing the negative pressure caused on the downstream side of the wings.

Although the invention is explained herein above with the specific embodiments shown in the drawings, the present invention is not limited to those embodiments described in the drawings, and it is obvious that any known configuration can also be adopted thereto providing the effectiveness of the present invention can be exerted.

What is claimed is:

1. A rotating disk type storage device, comprising:
   a rotating disk shaped recording medium rotating around a spindle shaft;
   a head stack assembly pivoting around a pivot shaft; and
   a spoiler provided with a wing facing the rotating disk shaped recording medium and a supporting section for the wing disposed on the upstream side of the head stack assembly in the airflow in accordance with the rotation of the rotating disk shaped recording medium, the wing extending in a direction from the outer circumference of the rotating disk shaped recording medium towards the spindle shaft while reducing the width of the wing, and is formed to have the width of the wing in a range of 2.7% through 2.9% of the circumferential length of the rotating disk shaped recording medium at a region located at the outer circumference of the rotating disk shaped recording medium.

2. The rotating disk type storage device according to claim 1, further comprising:
   a shroud disposed along a part of the outer circumference of the rotating disk shaped recording medium, wherein the spoiler is disposed between the downstream side of the shroud and the head stack assembly.

3. The rotating disk type storage device according to claim 1, wherein the wing of the spoiler is formed by extending an edge portion on the upstream side substantially straight in a direction from the outer circumference side of the rotating disk shaped recording medium towards the spindle shaft and extending an edge portion on the downstream side towards the edge portion on the upstream side so as to gradually narrowing the width.

4. The rotating disk type storage device according to claim 1, wherein the wing of the spoiler has a streamlined cross section.

5. The rotating disk type storage device according to claim 4, wherein the wing of the spoiler is formed to have a rounded shape in a forward line of the upstream side.

6. The rotating disk type storage device according to claim 1, wherein a surface of the wing of the spoiler is provided with an uneven shape.

7. A rotating disk type storage device, comprising:
   a rotating disk shaped recording medium rotating around a spindle shaft;
   a head stack assembly pivoting around a pivot shaft; and
   a spoiler provided with a wing facing the rotating disk shaped recording medium and a supporting section for the wing disposed on the upstream side of the head stack assembly in the airflow in accordance with the rotation of the rotating disk shaped recording medium, the wing extending in a direction from the outer circumference of the rotating disk shaped recording medium towards the spindle shaft while reducing the width of the wing, and is formed to have a substantially constant rate of the width of the wing to the corresponding circumferential length of the rotating disk shaped recording medium at each region within a range from the outer circumference of the rotating disk shaped recording medium to two thirds of the length of the wing in a direction towards the spindle shaft.

8. The rotating disk type storage device according to claim 7, wherein the rate of the width of the wing to the corresponding circumferential length of the rotating disk shaped recording medium is 2.8%±0.1%.

9. A rotating disk type storage device, comprising:
   a rotating disk shaped recording medium rotating around a spindle shaft;
   a head stack assembly pivoting around a pivot shaft;
   a spoiler provided with a wing facing the rotating disk shaped recording medium and a supporting section for the wing disposed on the upstream side of the head stack assembly in the airflow in accordance with the rotation of the rotating disk shaped recording medium; and
   a filter disposed between the downstream side of the spoiler and the head stack assembly and along the outer circumference of the rotating disk shaped recording medium.

10. The rotating disk type storage device according to claim 9, wherein the filter is attached to the supporting section of the spoiler.

11. The rotating disk type storage device according to claim 9, further comprising:
    a partition disposed between the spoiler and the head stack assembly and along the outer circumference of the rotating disk shaped recording medium.

12. The rotating disk type storage device according to claim 11, wherein the partition is formed integrally with the supporting section of the spoiler.

13. The rotating disk type storage device according to claim 9, wherein the wing of the spoiler is rotatably disposed in a disk enclosure, and has a structure capable of retracting from the rotating disk shaped recording medium when the rotating disk shaped recording medium is in one a stopped condition and a start-up condition.

14. The rotating disk type storage device according to claim 9, wherein, in the case in which a plurality of the rotating disk shaped recording mediums is stacked, the wing of the spoiler is only disposed in each space between the plurality of the rotating disk shaped recording mediums.

* * * * *